United States Patent [19]

Rieck et al.

[11] 4,304,758

[45] Dec. 8, 1981

[54] HYDROLYZABLE TITANYL SULPHATE SOLUTIONS BY DECOMPOSITION OF TERNARY RAW MATERIAL MIXTURES

[75] Inventors: Hilmar Rieck; Walter Gutsche; Peter Woditsch; Peter Panek, all of Krefeld, Fed. Rep. of Germany

[73] Assignee: Bayer Aktiengesellschaft, Leverkusen, Fed. Rep. of Germany

[21] Appl. No.: 213,540

[22] Filed: Dec. 5, 1980

[30] Foreign Application Priority Data

Dec. 21, 1979 [DE] Fed. Rep. of Germany ....... 2951746

[51] Int. Cl.$^3$ ..................... C01G 23/00; C01G 23/053
[52] U.S. Cl. ....................................... 423/82; 423/83; 75/1 T
[58] Field of Search ................ 423/69, 82, 83; 75/1 T

[56] References Cited

U.S. PATENT DOCUMENTS 2,631,924 3/1953 McKinney.

FOREIGN PATENT DOCUMENTS 161056 2/1955 Australia ................................ 423/82
1052378 3/1959 Fed. Rep. of Germany ........ 423/82

Primary Examiner—Herbert T. Carter
Attorney, Agent, or Firm—Sprung, Felfe, Horn, Lynch & Kramer

[57] ABSTRACT

A process for the preparation of a hydrolyzable titanyl sulphate solution comprising adding sulphuric acid having a concentration greater than about 86% to a ternary mixture of two slags and an ilmenite to bring the proportion by weight of $H_2SO_4$ to $TiO_2$ to from about 1.7:1 to 2.2:1 and adding water, dilute sulphuric acid or oleum in amount sufficient to bring the $H_2SO_4$ concentration to from about 86 to 96%, thereby to form the titanyl sulphate solution, the first slag having a $TiO_2$ content greater than about 80% and a Ti(III) content of about 22 to 40%, the second slag having a $TiO_2$ content of about 60 to 80% and a Ti(III) content of about 5 to 15%, and the ilmenite having a ratio of Fe(III) to Fe(II) of from about 1:1 to 10:1, the slags and ilmenite being present in such proportions that the ternary mixture of raw materials obtained has a molar ratio of Ti(III) to Fe(III)$\geq$1.4.

7 Claims, 1 Drawing Figure

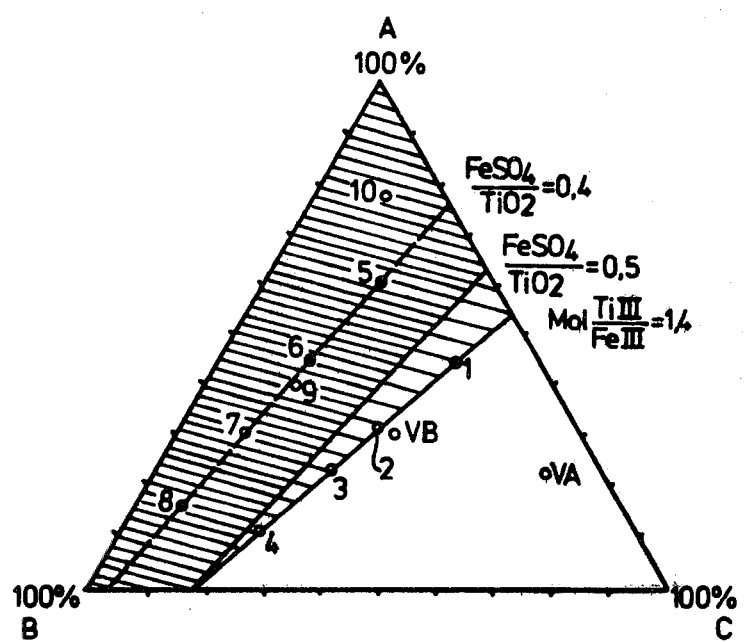

HYDROLYZABLE TITANYL SULPHATE SOLUTIONS BY DECOMPOSITION OF TERNARY RAW MATERIAL MIXTURES

This invention relates to a process for the preparation of a hydrolyzable titanyl sulphate solution suitable for processing into titanium dioxide pigments. The process involves the simultaneous decomposition of ternary raw material mixtures of slag having a high $TiO_2$ and Ti(III) content, slag having a low $TiO_2$ and Ti(III) content and ilmenite, using sulphuric acid having an $H_2SO_4$ content of greater than 86%, and dissolving of the solidified reaction mass in an aqueous solvent, the sulphuric acid preferably being added as oleum and pre-concentrated, recycled dilute acid.

The reaction of ternary mixtures of raw materials with $H_2SO_4$ affords numerous technical advantages. The preparation of titanium dioxide pigments by the sulphate process necessitates a flexible choice of raw materials, both on economic grounds and for reasons of availability. In principle, it is possible to use slags and ilmenites of various origins and compositions. It is particularly because of economic considerations that the simultaneous decomposition of mixtures is to be preferred to the separate decomposition of the individual raw material components.

The simultaneous reaction of ternary raw material mixtures containing titanium with $H_2SO_4$ has not yet been described. The reaction of binary raw material mixtures has been disclosed in British Pat. No. 741,757 and U.S. Pat. No. 2,631,924. Both methods result in widely fluctuating yields of soluble titanium sulphate, particularly if simultaneous reaction is carried out with increasing proportions by weight of ilmenite. It is therefore understandable if the process described in German Pat. No. 1,052,378 for the preparation of hydrolyzable titanyl sulphate solutions by the reaction of finely divided mixtures of ilmenite and molten titanium-containing slag with concentrated sulphuric acid and dissolving of the solidified reaction mass in an aqueous solvent is directed towards the reaction of mixtures of ilmenite and slag containing only from 10 to 20% of ilmenite.

It has now surprisingly been found that the simultaneous decomposition using concentrated sulphuric acid of ternary raw material mixtures containing titanium may also be used as an economic method, suitable for application on a large technical scale, for the production of a uniform titanyl sulphate solution suitable for working-up into titanium dioxide pigments. According to the present invention, a process which provides high decomposition yields and which is easy to handle with regard to the temperatures in the reaction and the solidification of the reaction mass may be obtained by using mixtures of a slag having a $TiO_2$ content of greater than about 80% and a Ti(III) content of about 22 to 40%, preferably about 25 to 35%, a slag having a $TiO_2$ content of about 60 to 80% and a Ti(III) content of about 5 to 15%, calculated, as above, as $TiO_2$ and based on the slag, and an ilmenite in which the proportion of Fe(III) to Fe(II) is from about 1:1 to 10:1, and reacting such a mixture as a ternary raw material mixture with sulphuric acid in such proportions that the molar ratio of Ti(III) to Fe(III) in the mixture is $\geq 1.4$, and the proportion, by weight, of $FeSO_4$ to $TiO_2$ is preferably $\leq 0.5$ most preferably $= 0.4$.

The decomposition of raw materials containing tinanium by means of mixtures of oleum or recycled pre-concentrated sulphuric acid has been variously described.

The known processes generally make use of the heat of dilution generated when a dilute sulphuric acid is brought together with a concentrated sulphuric acid to start the reaction. The concentration of the recycled pre-concentrated dilute acids used is therefore relatively low so that the heat of dilution generated when the dilute acids are mixed with the concentrated acid will be sufficient to enable the ore to react with the acid mixture within a certain length of time without additional supply of energy.

It is known that the decomposition of slags using oleum and pre-concentrated dilute acid recycled from this process is accompanied by an undesirable increase in the concentration of traces of heavy metals, such as chromium and vanadium, derived mainly from the slags. In the subsequent hydrolysis, these heavy metals are partly left behind in the titanium dioxide hydrolyzate produced and result in discoloration of the pigments when these are subsequently calcined.

It has now surprisingly been found that, when the ternary reaction mixtures having the composition according to the present invention are reacted using oleum and using recycled pre-concentrated dilute acid, this increase in the concentration of trace heavy metals, mainly derived from the slags, in the hydrolyzable titanyl sulphate solution obtained from the material after it has been dissolved in an aqueous solvent and clarified does not occur, or at least is sufficiently suppressed so that no damaging effect may be detected on the resulting pigments, if the recycled pre-concentrated dilute acid used in the process has been pre-concentrated to an $H_2SO_4$ concentration of about 60 to 75%, preferably about 63 to 71%.

The heat of dilution produced when this dilute acid is mixed with oleum is sufficient to enable the acid mixture to react with the ternary reaction mixtures according to the present invention without further supply of energy.

The present invention relates to a process for the preparation of a hydrolyzable titanyl sulphate solution by the simultaneous decomposition of slag-ilmenite mixtures with sulphuric acid and dissolving of the solidified reaction maxx in an aqueous solvent, in which process a finely divided slag having a $TiO_2$ content of greater than about 80% and a Ti(III) content of from about 22 to 40%, preferably from about 25 to 35%, a finely divided slag having a $TiO_2$ content of from about 60 to 80% and a Ti(III) content of from about 5 to 15% (calculated as $TiO_2$ and based on the slag, as above) and a finely divided ilmenite in which the proportion of Fe(III) to Fe(II) is from about 1:1 to 10:1 are brought together to form a ternary mixture of raw materials in which the molar ratio of Ti(III) to Fe(III) $\geq 1.4$ and the proportion, by weight, of $FeSO_4$ to $TiO_2$ is preferably $\leq 0.5$, and sulphuric acid having an $H_2SO_4$ concentration of greater than 86% is added to the ternary raw material mixture to adjust the proportion, by weight, of $H_2SO_4$ to $TiO_2$ to from about 1.7:1 to 2.2:1, and the reaction is started by the addition of the quantity of water, dilute sulphuric acid or steam required to adjust the $H_2SO_4$ concentration to from about 86 to 96%.

In another embodiment of the present process, at least one of the above-mentioned finely divided components of the raw material is first mixed with oleum or preconcentrated dilute acid, and the quantity of remaining finely divided raw material component(s) required to make up the aforesaid ternary mixture of raw materials is added in pre-concentrated dilute acid or oleum. According to the preferred embodiment of the present process, all of the components of the ternary raw material mixture are ground together, the oleum or pre-concentrated dilute acid is added and the reaction is started with pre-concentrated dilute acid or oleum. In yet another preferred embodiment of the process, oleum having an $SO_3$ content of up to 30% and recycled pre-concentrated dilute acid having an $H_2SO_4$ concentration of from 60 to 75%, preferably from 63 to 71%, are used.

All of the embodiments of the present process mentioned above enable the decomposition of the above-mentioned ternary raw material mixturs using sulphuric acid or a mixture of oleum and recycled pre-concentrated dilute acid to be carried out by either a batchwise or a continuous method. According to the present invention, however, the aforesaid ternary raw material mixtures, which are characterized by having a molar ratio of Ti(III) to Fe(III)$\geq$1.4 and a proportion, by weight, of $FeSO_4$ to $TiO_2\leq0.5$, are preferably used batchwise, owing to the greater safety of operation. Various ternary raw material mixtures having a Ti(III) to Fe(III) ratio=1.4 may be used in a continuous process (see FIG. 1).

The process according to the present invention not only operates highly economically, but also provides considerable technical advantages compared with the preparation of a hydrolyzable titanyl sulphate solution either from only one of the raw materials or by separate decomposition of the individual raw material components, followed by combining of the various solutions.

When slags alone are reacted using sulphuric acid, a high Ti(III) content acts as a reducing agent on the sulphuric acid so that part of the sulphuric acid is lost as sulphur dioxide or hydrogen sulphide and must be removed from the exhaust air. Furthermore, the solution obtained as a result of reaction may contain considerable quantities of Ti(III) so that it is hardly suitable for the subsequent hydrolysis since the Ti(III) must first be oxidized in order that the solution may be hydrolyzed with high yields. If, on the other hand, ilmenites containing $Fe_2O_3$ are reacted on their own using sulphuric acid, the solutions obtained must be mixed with large quantities of iron scrap before hydrolysis in order to reduce the Fe(III) ions to Fe(II) ions.

This uses up a further quantity of sulphuric acid and the total iron content of the solutions is so greatly increased that the solutions may no longer be directly used for hydrolysis, but must first be cooled to separate the iron, e.g. in the form of $FeSO_4.7H_2O$. In the process according to the present invention, the Ti(III) in the slags reacts preferentially with the Fe(III) of the ilmenite, and consequently the additional reduction of Fe(III) and additional Ti(III) oxidation and separation of iron may be avoided and the additional consumption of sulphuric acid is also avoided.

Furthermore, compared with the separate decomposition of slags containing $TiO_2$ and Ti(III) and of an ilmenite in such proportions that all the iron in the ilmenite solution is reduced to Fe(II) by the Ti(III) still present in the slag solutions, the process according to the present invention provides the advantage that the proportions of ilmenite processed may be kept constant.

Furthermore, the process according to the present invention is ecologically advantageous since the pre-concentrated dilute acid may be recycled by a simple operation. This is particularly important when considerable proportions of ilmenite are used.

The process according to the present invention enables three commonly available raw materials to be processed in a very economical manner by a technically simple method in which considerable proportions of preconcentrated dilute acid are recycled without any loss of decomposition yield and without any accumulation in the reaction solution of traces of heavy metals, such as chromium or vanadium, from the slags. A hydrolyzable titanyl sulphate solution which may be directly used for the production of titanium dioxide pigments is thus obtained by dissolving of the reaction mass in an aqueous solvent and a clarification step without an additional reduction to lower the Fe(III) content in the ilmenite and without an additional oxidation to lower the Ti(III) content in the slags. The process also avoids the losses of sulphuric acid resulting from reaction of the Ti(III) with sulphuric acid and from the reaction with iron scrap to reduce the Fe(III) content in the ilmenite. Furthermore, the reduction potential of the slags is completely utilized for the reaction with the Fe(III) content of the ilmenite so that the total iron content in the titanyl sulphate solutions obtained is so low that separation of the iron, e.g. in the form of $FeSO_4.7H_2O$, is unnecessary.

The process, according to the present invention, is exemplified below. All figures given are in percentages, by weight, unless otherwise indicated.

The drawing is a graph showing the mixtures used in the examples and comparison experiments, the area of claimed mixtures being shaded and the preferred mixtures being shown densely shaded.

EXAMPLES 1 to 4

A 96% sulphuric acid was introduced in the quantity shown in Table 1 into a 500 ml glass vessel which was equipped with a thermometer and stirrer and placed in an air bath which could be adjusted to the reaction temperature in the reaction vessel to compensate for the loss of heat by radiation. A ternary mixture of raw materials, consisting of: slag A ground to a particle size of 87.9%$<$40$\mu$ and having a $TiO_2$ content of 87%, a Ti(III) content of 30% (calculated as $TiO_2$ and based on the slag) and an Fe content of 7.7%; slag B ground to a particle size of 78.4%$<$40$\mu$ and having a $TiO_2$ content of 70.8%, a Ti(III) content of 7.9% (calculated as $TiO_2$ and based on the slag) and an Fe content of 9.9%; and an ilmenite ground to a particle size of 93.7%$<$40$\mu$ having a $TiO_2$ content of 60.2%, an Fe content of 25% and an Fe(III) to Fe(II) ratio of 2.29:1; was introduced, and water was added at 40° C. with vigorous stirring to start the reaction. The mixture contained 100 g of $TiO_2$ and the molar ratio of Ti(III) to Fe(III) was 1.4:1, the ratio of $FeSO_4$ to $TiO_2$ was as shown in Table 1, the ratio of $H_2SO_4$ to $TiO_2$ was 2.0:1 and the final $H_2SO_4$ concentration was 91%.

After all the water had been added, the maximum reaction temperatures of the exothermic reaction were reached at the times indicated in Table 1. The solidified reaction mass was then aged for 5 hours, during which the temperature fell to 180° C., and the mass was finally dissolved by the addition of 300 ml of water in 4 hours at 70° C. The $TiO_2$ yield is shown in Table 1 as the percentage present in the solution of the total $TiO_2$ content put into the process.

In examples 1 to 4, it was invariably observed that the time taken for the reaction mixture to solidify was almost double that required for reaching the maximum reaction temperature.

The reactions carried out according to examples 1 to 4 are therefore less suitable for a batchwise process since the substance is still a highly viscous mass at the maximum reaction temperature, which is not suitable for the formation of a pore structure, so that the escape of water vapor and subsequent dissolving of the reaction mixture are more difficult.

For a batchwise process, the time at which the maximum reaction temperature is reached should preferably coincide with the solidification of the reaction cake, for the reasons explained above.

TABLE 1:

| | Extraction data of Examples 1 to 4 | | | | | | | | | |
|---|---|---|---|---|---|---|---|---|---|---|
| Example | $H_2SO_4$ 96% [g] | Slag A [g] | Slag B [g] | Ilmenite [g] | Water to start the reaction [g] | Ratio $FeSO_4$ :$TiO_2$ | Reaction time [min] | Time for solidification of the cake [min] | Maximum reaction temperature [°C.] | $TiO_2$ yield [%] | Ti(III) [% of dissolved $TiO_2$] |
| 1 | 246.5 | 59.8 | 20.4 | 55.7 | 13.5 | 0.56 | 22 | 41 | 209 | 94.6 | 1.8 |
| 2 | 245.6 | 44.0 | 45.6 | 48.4 | 13.5 | 0.55 | 25 | 41 | 206 | 94.3 | 1.4 |
| 3 | 244.6 | 30.9 | 67.4 | 42.1 | 13.4 | 0.53 | 24 | 39 | 207 | 92.5 | 1.5 |
| 4 | 243.7 | 15.7 | 72.9 | 34.3 | 13.4 | 0.52 | 24 | 41 | 206 | 93.2 | 0.8 |

EXAMPLES 5 to 8

94.2 g of recycled dilute acid concentrated to 66.8% $H_2SO_4$ were introduced into the apparatus described in examples 1 to 4. A ternary mixture of raw materials, consisting of the individual components described in examples 1 to 4 in the quantities indicated in Table 2 was introduced, and 153.9 g of oleum having an $SO_3$ content of 25.8% were added at 40° C. with vigorous stirring to start the reaction. The mixture thus contained 100 g of $TiO_2$ and the molar ratio of Ti(III) to Fe(III) reached the values shown in Table 2. The proportion, by weight, of $FeSO_4$ to $TiO_2$ was 0.4, the proportion, by weight, of $H_2SO_4$ to $TiO_2$ was 2.0:1 and the final concentration of $H_2SO_4$ was 91%. The time taken for the maximum reaction temperatures to be reached in the exothermic reaction after all the oleum had been added is shown in Table 2. The solidified reaction mass was then aged and dissolved as in examples 1 to 4. The $TiO_2$ yield (percent $TiO_2$ dissolved in proportion to the quantity of $TiO_2$ put into the process) is shown in Table 2.

All reaction mixtures solidify at virtually the same time that the maximum reaction temperature is reached, and are therefore suitable for a batchwise process.

The relatively high Ti(III) content of the resulting solutions is due to the procedure employed since in laboratory experiments the injection of air to effect stirring was omitted. When methods carried out industrially are simulated, the remaining Ti(III) contents are oxidized by air.

This is illustrated in the following example, in which mechanical stirring is replaced by the method of blowing air through the reaction mixture.

EXAMPLE 9

In this example, methods similar to those used industrially are employed on a laboratory scale for the decomposition of raw material mixtures using sulphuric acid according to the present invention. 337 g of recycled dilute acid concentrated to an $H_2SO_4$ content of 65.1% were introduced into a 1600 ml glass vessel having a cone-shaped bottom equipped with a thermometer and an immersion tube for the introduction of air and placed in an air bath which may be readjusted to the reaction temperature in the reaction vessel to compensate for the loss of heat by radiation, and 500 g of a ternary raw material mixture consisting of the individual components characterized in examples 1 to 4 as to the chemical composition and particle size thereof and comprising 200 g of slag A, 225 g of slag B and 75 g of ilmenite were introduced, and 572 g of oleum having a concentration of $SO_3$ of 21% were added to start the reaction while air was passed through at room temperature at the rate of 500 l per hour. The mixture contained 378.5 g of $TiO_2$, the molar ratio of Ti(III) to Fe(III) was 4.19:1, the proportion, by weight of $FeSO_4$ to $TiO_2$ was 0.42:1, the proportion by weight of $H_2SO_4$ to $TiO_2$ was 1.9:1 and the final concentration of $H_2SO_4$ was 90%.

When oleum was added, an exothermic reaction took place and the maximum temperature of 206° C. was reached 46 minutes after the addition of oleum was begun. The reaction mass solidified 37 minutes after the addition of oleum was begun. After the maximum reaction temperature had been reached, the solidified reaction mass was aged for 5 hours at 180° C. in a drying cupboard and then dissolved by the addition of 1200 ml of water in 4 hours at 70° C. while air was passed through at the rate of 100 l per hour.

The solution contained 92.8% of the $TiO_2$ put into the process, and 0.9% of the dissolved $TiO_2$ was present as Ti(III).

EXAMPLE 10

In accordance with the application, 94.3 g of recycled dilute acid concentrated to an $H_2SO_4$ concentration of 65% was introduced into the reaction apparatus described in examples 1 to 4, and 122.0 g of a ternary raw

TABLE 2:

| | Extraction data of Examples 5 to 8 | | | | | | | | |
|---|---|---|---|---|---|---|---|---|---|
| Example | Slag | Slag | Ilmenite | Mol $\frac{Ti(III)}{Fe(III)}$ : | Reaction time [min] | Time for Solidification of cake [min] | Maximum reaction temperature [°C.] | $TiO_2$ yield [%] | Ti(III) [% of dissolved $TiO_2$] |
| 5 | 77.1 | 24.8 | 25.5 | 3.93 | 14 | 20 | 204 | 94.4 | 12.5 |
| 6 | 59.5 | 50.3 | 20.9 | 4.06 | 17 | 19 | 205 | 94.6 | 8.3 |
| 7 | 40.3 | 78.0 | 16.1 | 4.17 | 16 | 17 | 206 | 94.5 | 7.9 |
| 8 | 21.4 | 106.2 | 10.3 | 4.86 | 16 | 17 | 207 | 95.3 | 6.3 | material mixture consisting of the individual components specified in examples 1 to 4 as to the chemical composition and particle size thereof, comprising 94.5 g of slag A, 12.2 g of slag B and 15.3 g of ilmenite were introduced, and 152.0 g of oleum having an $SO_3$ concentration of 24.5% were introduced with stirring at 40° C. to start the reaction. The mixture contained 100 g of $TiO_2$, the molar ratio of Ti(III) to Fe(III) was 7.59, the proportion, by weight, of $FeSO_4$ to $TiO_2$ was 0.33, the proportion, by weight, of $H_2SO_4$ to $TiO_2$ was 2.0 and the final concentration of $H_2SO_4$ was 90%. After the addition of oleum, an exothermic reaction took place and the maximum reaction temperature of 206° C. was reached in 13 minutes. The reaction mass solidified 16 minutes after the addition of oleum. After the maximum reaction temperature had been reached, the solidified reaction mass was aged for 5 hours at 180° C. in a drying cupboard and subsequently dissolved by the addition of 300 ml of water in 4 hours at 70° C. 94.3% of the $TiO_2$ put into the process was in solution and 15.6% of the dissolved $TiO_2$ was in the form of Ti(III).

Comparison Example VA

In a comparison example, 845 g of sulphuric acid having a concentration of 96% $H_2SO_4$ were introduced into the apparatus described in example 9 and 500 g of a ternary mixture of raw materials consisting of the individual components specified in examples 1 to 4 as regards the chemical composition and particle size thereof, comprising 110 g of slag A, 50 g of slag B and 340 g of ilmenite, were introduced, and 76.8 g of water were added to start reaction while air was passed through the reaction mixture for 12 minutes at the rate of 500 l per hour at room temperature. The mixture contained 335.8 g of $TiO_2$ and the molar ratio of Ti(III) to Fe(III) was 0.44, the proportion by weight, of $FeSO_4$ to $TiO_2$ was 0.8, the proportion, by weight, of $H_2SO_4$ to $TiO_2$ was 88%. After the addition of water was begun, an exothermic reaction took place and the maximum reaction temperature of 195° C. was reached in 50 minutes. The reaction mass solidified 43 minutes after the addition of water was begun. After the maximum reaction temperature had been reached, the solidified reaction mass was aged for 3 hours in a drying cupboard at 180° C. and then dissolved in 8 hours at 70° C. by the addition of 1200 ml of water, 30.7 g of 96% sulphuric acid and 20.0 g of iron scrap to reduce the excess Fe(III) content, while air was passed through at the rate of 100 l per hour. 90.3% of the $TiO_2$ put into the process was in solution and 1.1% of the dissolved $TiO_2$ was present as Ti(III).

This comparison example VA, which uses a mixture of raw materials far outside the range claimed (see FIG. 1), demonstrates that the reaction yields for dissolved $TiO_2$ obtained according to the present invention cannot be obtained even with the addition of iron scrap.

Comparison Example VB

In another Comparison Example, 247 g of sulphuric acid having an $H_2SO_4$ concentration of 96% were introduced into the reaction apparatus described in examples 1 to 4 and 139.9 g of a ternary mixture of raw materials consisting of the individual components characterised in examples 1 to 4 as regards the chemical composition and particle size thereof and comprising 42.0 g of slag A, 43.3 g of slag B and 54.6 g of ilmenite were introduced and 13.6 g of water were added at 40° C. with stirring to start the reaction. The mixture contained 100 g of $TiO_2$, the molar ratio of Ti(III) to Fe(III) was 1.2, the proportion, by weight, of $FeSO_4$ to $TiO_2$ was 0.57, the proportion, by weight of $H_2SO_4$ to $TiO_2$ was 2.0 and the final concentration of $H_2SO_4$ was 91%. After the addition of water, the maximum reaction temperature of 208° C. was reached in 21 minutes in an exothermic reaction. The reaction mass solidified 47 minutes after the addition of water. After the maximum reaction temperature had been reached, the solidified reaction mass was aged from 5 hours at 180° C. in a drying cupboard and subsequently dissolved in 4 hours at 70° C. by the addition of 300 ml of water and 0.8 g or iron scrap. 77.0% of the $TiO_2$ put into the process were in solution and traces of the dissolved $TiO_2$ were present as Ti(III).

Comparison examples VA and VB demonstrate that ternary mixtures outside the range claimed in this application (see FIG. 1) require considerable quantities of scrap to adjust the solution to a desired low Ti(III) level. Even under these conditions, the decomposition yields are not completely satisfactory (Comparison Example VA) even if the times for solution are considerably prolonged (low volume/time yields); and if the quantity of scrap is added is distinctly too low, considerable losses in yield are suffered (Comparison Example VB).

It will be understood that the specification and examples are illustrative but not limitative of the present invention and that other embodiments within the spirit and scope of the invention will suggest themselves to those skilled in the art.

We claim:

1. A process for the preparation of hydrolyzable titanyl sulphate solution comprising adding sulphuric acid having a concentration greater than about 86% to a ternary mixture of two slags and an ilmenite to bring the proportion by weight of $H_2SO_4$ to $TiO_2$ to from about 1.7:1 to 2.2:1 and adding water, dilute sulphuric acid or oleum in amount sufficient to bring the $H_2SO_4$ concentration to from about 86 to 96%, thereby to form the titanyl sulphate solution, the first slag having a $TiO_2$ content greater than about 80% and a Ti(III) content of about 22 to 40%, the second slag having a $TiO_2$ content of about 60 to 80% and a Ti(III) content of about 5 to 15%, and the ilmenite having a ratio of Fe(III) to Fe(II) of from about 1:1 to 10:1, the slags and ilmenite being present in such proportions that the ternary mixture of raw materials obtained has a molar ratio of Ti(III) to Fe(III) $\geq 1.4$.

2. A process according to claim 1, wherein the Ti(III) content of the first slag is from about 25 to 35%.

3. A process according to claim 1, wherein the proportion by weight of $FeSO_4$ to $TiO_2$ in the ternary mixture $\leq 0.5$.

4. A process according to claim 1, wherein at least one of the components of the ternary mixture is first mixed with oleum or pre-concentrated dilute acid, and the balance of the components still required for preparing the ternary mixture in then added in pre-concentrated dilute acid or oleum.

5. A process according to claim 1 wherein the components making up the ternary mixture are first ground together, oleum or pre-concentrated dilute acid is added and reaction is then started using pre-concentrated dilute acid or oleum.

6. A process according to claim 4 or 5, wherein there are used oleum having an $SO_3$ content of up to about 30% and recycled pre-concentrated dilute acid having an $H_2SO_4$ concentration of about 60 to 75%.

7. A process according to claim 2, wherein the proportion by weight of $FeSO_4$ to $TiO_2$ in the ternary mixture $\leq 0.4$.

* * * * *